(12) United States Patent
Keh et al.

(10) Patent No.: US 10,458,047 B2
(45) Date of Patent: Oct. 29, 2019

(54) SYSTEM AND METHOD FOR RECYCLING FIBERS FROM TEXTILES WASTE

(71) Applicant: Novetex Textiles Limited, Hongkong (CN)

(72) Inventors: Edwin Yee Man Keh, Hongkong (CN); Milton Chan, Hongkong (CN); Lei Yao, Hongkong (CN); Kin-Ming Leung, Hongkong (CN); Xiao Liao, Hongkong (CN); Alex Chan, Hongkong (CN); Li Chi, Hongkong (CN); Xinxin Huang, Hongkong (CN)

(73) Assignee: Novetex Textiles Limited, Hongkong (CN)

( * ) Notice: Subject to any disclaimer, the term of this patent is extended or adjusted under 35 U.S.C. 154(b) by 143 days.

(21) Appl. No.: 15/877,375

(22) Filed: Jan. 22, 2018

(65) Prior Publication Data

US 2019/0226125 A1    Jul. 25, 2019

(51) Int. Cl.
| | | |
|---|---|---|
| *D01G 11/00* | (2006.01) |
| *D01G 31/00* | (2006.01) |
| *D01G 9/12* | (2006.01) |
| *D01G 9/14* | (2006.01) |
| *D01G 11/04* | (2006.01) |
| *D01G 15/82* | (2006.01) |
| *D04H 1/4274* | (2012.01) |

(52) U.S. Cl.
CPC ............ *D01G 31/003* (2013.01); *D01G 9/12* (2013.01); *D01G 9/14* (2013.01); *D01G 11/00* (2013.01); *D01G 11/04* (2013.01); *D01G 15/82* (2013.01); *D04H 1/4274* (2013.01)

(58) Field of Classification Search
CPC . D01G 9/12; D01G 9/14; D01G 11/00; D01G 31/003; A61L 2/16; A61L 2/20; A61L 2/202; A61L 2/206; A61L 2/208
See application file for complete search history.

(56) References Cited

U.S. PATENT DOCUMENTS

| | | | |
|---|---|---|---|
| 2012/0315816 A1* | 12/2012 | Fowler | .................... B32B 5/022 442/327 |
| 2018/0202102 A1* | 7/2018 | Yang | ......................... D21C 9/02 |
| 2019/0118233 A1* | 4/2019 | Konishi | .................... A61L 2/03 |

* cited by examiner

*Primary Examiner* — Sean E Conley
(74) *Attorney, Agent, or Firm* — Wayne & Ken, LLC; Tony Hom (57) ABSTRACT

The present disclosure related to a system and method for recycling fibers from textiles waste. The system includes a first sanitization device; a pre-processing device; a fabric sorting device; a storage device; a fiber processing device; and a second sanitization device mounted in the fiber processing device. The first sanitization device, the pre-processing device, the fabric sorting device, the storage device and the fiber processing device are arranged along a transmission path of the textiles waste.

14 Claims, 6 Drawing Sheets

SYSTEM AND METHOD FOR RECYCLING FIBERS FROM TEXTILES WASTE

FIELD OF THE INVENTION

The present disclosure relates to the field of fiber recycling, and more specifically, to a system and method for recycling fibers from textiles waste.

BACKGROUND OF THE INVENTION

Increasing expenses associated with obtaining raw material and constantly increasing consumption of textile products provide a strong economic incentive for developing methods for recycling unused or post-consumer textile material which would otherwise go to waste to be burned or buried. Qualified recycled fibers from the wasted garment/clothing need to be with adequate physical strength and hygienically clean. However, the current methods for recycling unused or post-consumer textile material cannot produce qualified hygienically clean textile fibers from textiles waste such as used or post-consumer garments. Recycled fibers are not pure in color, a dyeing process is thus needed to produce fibers with uniformed color, which means that additional setting of waste water treatment device is needed.

Further, several steps of the current methods for recycling unused textile material are performed manually, and thus the production efficiency is low.

BRIEF SUMMARY OF THE INVENTION

In order to overcome the problems existing in the related art, embodiments of the present disclosure provide a system and method for recycling fibers from textiles waste. The technical solutions are as follows.

According to a first aspect of one embodiment of present disclosure, a system for recycling fibers from textiles waste is provided and includes: a first sanitization device; a pre-processing device; a fabric sorting device; a storage device; a fiber processing device; and a second sanitization device mounted in the fiber processing device. The first sanitization device, the pre-processing device, the fabric sorting device, the storage device and the fiber processing device are arranged along a transmission path of the textiles waste.

According to a second aspect of one embodiment of present disclosure, a method for recycling fibers from textiles waste by using the above system is provided and includes: initially sanitizing the textiles waste with the first sanitization device; manually removing non-fibrous objects from the sanitized textiles waste; detecting pieces attached with metal and removing the pieces attached with metal; obtaining a color detection result and transmitting the color detection result to a robot and a blower of the fabric sorting device; placing, by the robot and the blower, the sanitized textiles waste into corresponding category containers according to the color detection result; storing the category containers in the storage device; upon receipt of order from the fiber processing device, transporting the category containers to the fiber processing device; cutting the sanitized textiles waste from the category containers into smaller pieces for fiber processing, and sanitizing the opened fibers with the second sanitization device.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION OF THE INVENTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
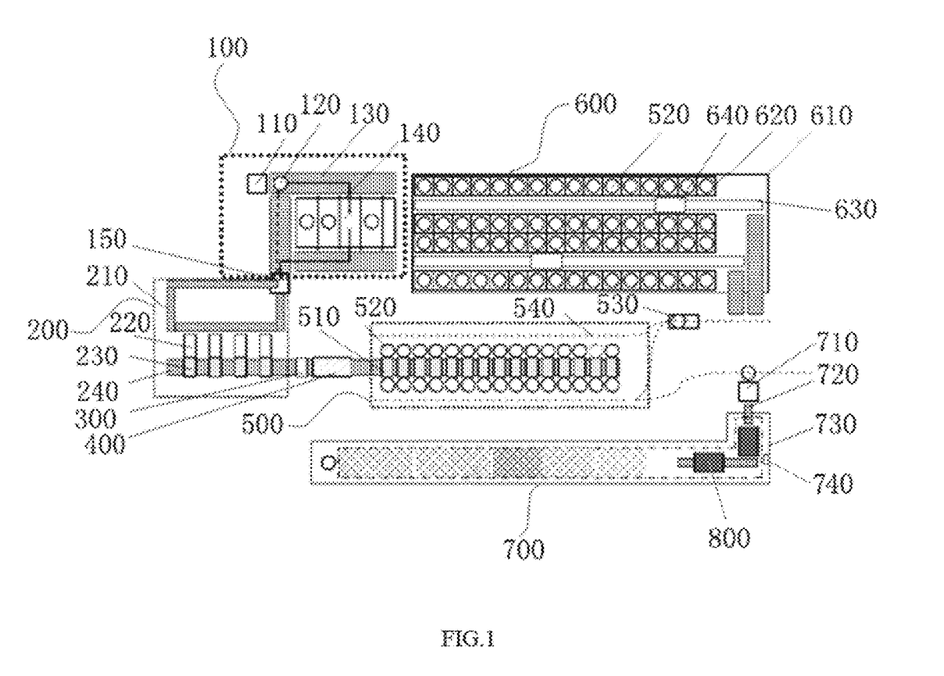
FIG. 1 is a schematic view of a system for recycling fibers from textiles waste according to an exemplary embodiment.

FIG. 1 is a schematic view of a system for recycling fibers from textiles waste according to an exemplary embodiment. Referring to FIG. 1, the system includes a first sanitization device 100, a pre-processing device 200, a detection device 300, a color detection device 400, a fabric sorting device 500, a storage device 600, a fiber processing device 700 and a second sanitization device 800. The first sanitization device 100, the pre-processing device 200, the detection device 300, the color detection device 400, the fabric sorting device 500, the storage device 600 and the fiber processing device 700 are sequentially connected along a transmission path of textiles waste, and the second sanitization device 800 is mounted in the fiber processing device 700. Since the system has two sanitization devices including the first sanitization device 100 and the second sanitization device 800, 90% or more micro-organisms on textiles waste such as used or post-consumer garments can be killed. Further, since the second sanitization device 800 is mounted in the fiber processing device 700, apart from fabric surface, interlayer between fabric surfaces are also sanitized by the first sanitization device 100 and the second sanitization device 800.

Figure 2:
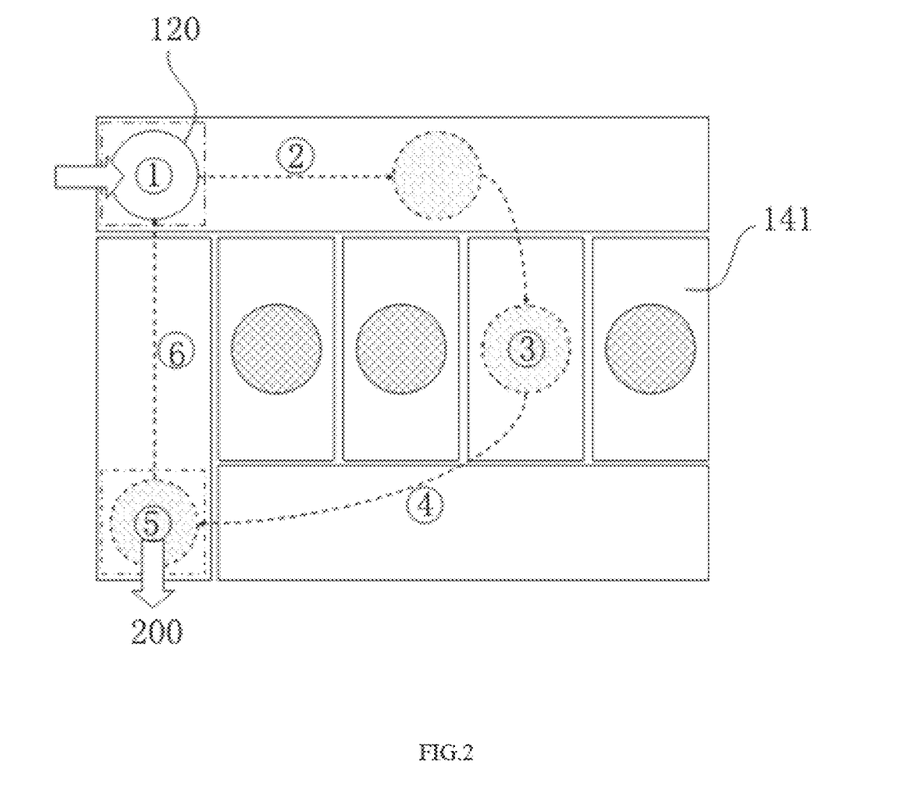
FIG. 2 is a schematic enlarged view of a first sanitization device which can be applied to the system for recycling fibers from textiles waste shown in FIG. 1 according to an exemplary embodiment.

Specifically, the first sanitization device 100 may be a fumigation device. In one embodiment as shown in FIG. 1, the first sanitization device 100 includes an inlet 110, a container 120, a conveyor 130, a fumigation structure 140 and an outlet 150. Referring also to FIG. 2, incoming material such as used or post-consumer garments is firstly fed into the container 120 through the inlet 110, then the container 120 loaded with the incoming material is moved by the conveyor 130 to the fumigation structure 140 to perform fumigation operation, and then the container 120 is further moved to the outlet 150 by the conveyor 130, thereby feeding the fumigated material (which has been initially sanitized by the-fumigation structure 140 of the first sanitization device 100) to the pre-processing device 200. After that, the empty container 120 is moved by the conveyor 130 back to the inlet 110. In this way, the container 120 is automatically moved in circle by the conveyor 130 as shown in FIG. 2. Referring to FIG. 2, the container 120 is being moved by the conveyor 130 along a path ①→②→③→④→⑤→⑥, where ① represents the inlet 110, ③ represents the fumigation structure 140, ⑤ represents the outlet 150, and ②, ④ and ⑥ represent passages, so that the incoming material from the inlet 110 is fumigated in the fumigation structure 140 before being moved to the outlet 150. This system allows multiple batches of fumigation to be taken place concurrently.

Figure 3:
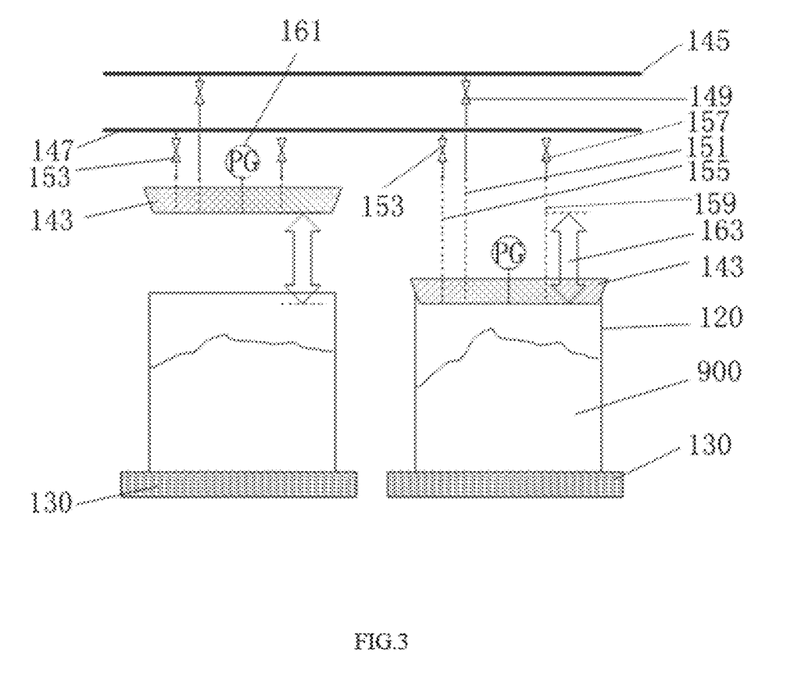
FIG. 3 is a schematic enlarged view of the fumigation structure of the first sanitization device shown in FIG. 2.

FIG. 3 is a schematic enlarged view of the fumigation structure 140 of the first sanitization device 100 shown in FIG. 2. Referring to FIG. 2 and FIG. 3, the fumigation structure 140 includes at least one chamber 141, a container cover 143 in each chamber 141, a vacuum line 145, a sanitization gas line 147, a vacuum line valve 149 with a first flexible hose 151 extending through the container cover 143, a sanitization gas line valve 153 with a second flexible hose 155 extending through the container cover 143, a vacuum break valve 157 with a third flexible hose 159 extending through the container cover 143, a pressure gauge 161 mounted in the container cover 143 for detecting pressure in the container 120 when the container 120 is sealed by the container cover 143, and a driving mechanism 163.

During the fumigation operation, the driving mechanism 163 firstly drives the container cover 143 to move downward (when the fumigation structure 140 is in a position shown in FIG. 3) to seal the container 120. Then, the vacuum line valve 149 is turned on, and the sanitization gas line valve 153 and the vacuum break valve 157 are turned off, thereby evacuating the container 120 to a certain vacuum level, e.g., −0.3 barG. After that, the sanitization gas line valve 153 is turned on, and the vacuum line valve 149 and the vacuum break valve 157 are turned off, thereby filing sanitization gas into the container 120 until the pressure in the container 120 is atmospheric pressure and then performing fumigation operation. Then, the vacuum line valve 149 is turned on, and the sanitization gas line valve 153 and the vacuum break valve 157 are turned off, thereby evacuating the container 120 to a certain vacuum level, i.e., −0.3 barG. After that, the vacuum break valve 157 is turned on, the-sanitization gas line valve 153 and the vacuum line valve 149 are turned off, thereby filing air into the container 120 until the pressure in the container 120 is atmospheric pressure. Then, the driving mechanism 163 drives the container cover 143 to move upward away from the container 120, and then the fumigated material 900 in the container 120 will be moved to the pre-processing device 200.

Referring to FIG. 1 again, the pre-processing device 200 includes a delivery conveyor 210, a manual processing station 220, a distributor 230, and an indexing conveyor 240. The delivery conveyor 210 is adjacent to the output 150 of the first sanitization device 100, so as to receive the fumigated material from the first sanitization device 100. At the manual processing station 220, non-fibrous objects such as buttons and zips are manually removed, and the fumigated material is transferred from the delivery conveyor 210 to the distributor 230 on the indexing conveyor 240 and then is individually moved towards the detection device 300.

The detection device 300 such as a metal detection device detects the fumigated material and rejects pieces attached with metal. Then the detected-fumigated material is further individually moved towards the color detection device 400.

Figure 4:
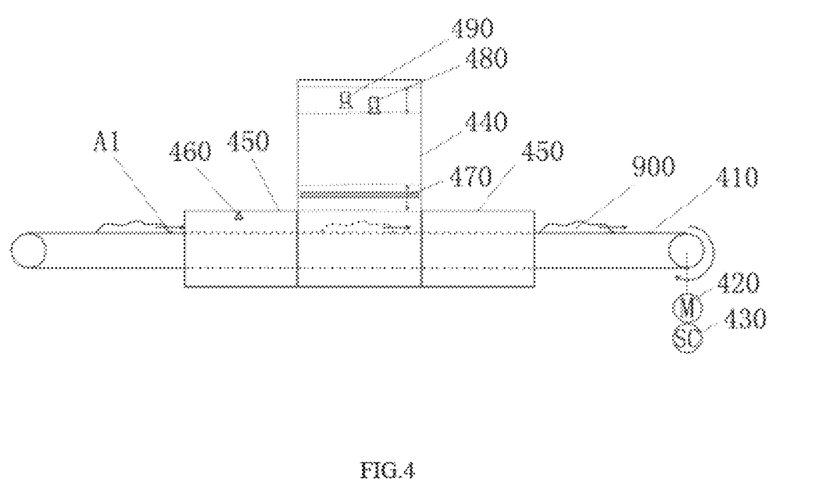
FIG. 4 is a schematic enlarged view of a color detection device which can be applied to the system for recycling fibers from textiles waste shown in FIG. 1 according to an exemplary embodiment.

FIG. 4 is a schematic enlarged view of the color detection device 400. The color detection device 400 includes a conveyor 410, a conveyor driving motor 420, a motor variable speed driver 430, a light booth 440, a light-booth inlet-output hood 450, a photo sensor 460, a light source 470, a first camera 480 and a second camera 490.

Specifically, the conveyor driving motor 420 is connected with the conveyor 410 and is controlled by the motor variable speed driver 430 to drive the conveyor 410 to move along a direction indicated by an arrow A1 shown in FIG. 4. The movement of the conveyor 410 drives the fumigated material 900 to individually move towards the light booth 440. When the fumigated material 900 is moved to a position detected by the photo sensor 460, the photo sensor 460 may feedback a signal to control the light-booth inlet-output hood 450 to open, thereby allowing the fumigated material 900 to individually move into the light booth 440. The light source 470, the first camera 480 and the second camera 490 are disposed in the light booth 440. The light source 470 emits light, and the first camera 480 and the second camera 490 receive light reflected by the fumigated material 900, thereby determining color of the fumigated material 900 and then obtaining a color detection result. The photo sensor 460 detects the arrival of test subject and triggers camera 480 and 490 to shot after a certain delay. Positions of the light source 470, the first camera 480 and the second camera 490 are adjusted vertically (when the color detection device 400 is in a position shown in FIG. 4), so as to obtain an accurate color detection result.

After the color detection result is obtained, the fumigated material 900 is moved out of the light booth 440 and is moved towards the fabric sorting device 500. Meanwhile, the color detection result is transmitted to the fabric sorting device 500.

Referring to FIG. 1, the fabric sorting device 500 includes a distributor 510, category containers 520, a robot (not shown) and an air blower (not shown). The robot and the air blower receive the color detection result, and then place the fumigated material into corresponding category containers 520 according to the color detection result. Since the fabric sorting device 500 uses the robot and the blower to place sorted fumigated material into category containers 520, thereby eliminating or alleviating the dust problem. Further, the robot of the fabric sorting device 500 receives the color detection result from the color detection device 400 and then automatically places the fumigated material into corresponding category containers 520 according to the color detection result, thus high degree of automation and high accuracy are achieved. When one category container 520 is filled up, the filed category container 520 is transferred by an automated guided vehicle (AGV) 530 along an automated guided vehicle path 540 to the storage device 600.

The storage device 600 includes a storage region 610, rows of supporting structures 620 for carrying the category containers 520, a rail 630 between adjacent rows of supporting structures 620, and a cart 640 slidably mounted on the rail 630. The cart 640 can automatically store the category containers 520. Upon reception of order from downstream, the cart 640 automatically transports the corresponding category containers 520 to the fiber processing device 700 for production.

The fiber processing device 700 takes the fumigated material 900 such as color sorted fabrics out of the category containers 520 and cuts them into smaller pieces for fiber processing. In one embodiment, as shown in FIG. 1, the fiber processing device 700 includes a feed port 710 and a conveyor 720. A dust closure 730 covers the whole fiber processing device 700 except for the feed port 710. Further, the fiber processing device 700 may further include a suction nozzle 740 within the dust closure 730 to extract the dust from the operation environment. Since the fumigated material 900 has been color sorted before entering into the fiber processing device 700, subsequent dyeing process and waste water treatment can be eliminated or minimized.

Figure 5:
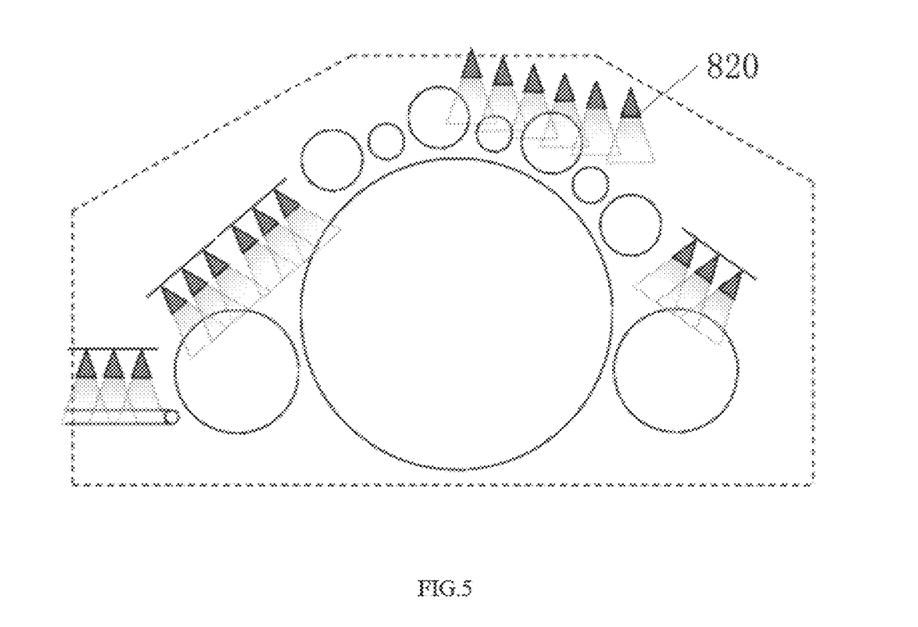
FIG. 5 is a schematic enlarged view of a fiber processing device with a second sanitization device which can be applied to the system for recycling fibers shown in FIG. 1 according to an exemplary embodiment.

FIG. 5 is a schematic enlarged view of the fiber processing device 700 with the second sanitization device 800. Referring to FIG. 1 and FIG. 5, the second sanitization device 800 may be an ultraviolet sanitization device which includes UV lighting sources 820. The ultraviolet light is an environmentally friendly way to sanitize the fumigated material 900 such as the opened fibers from color sorted fabrics.

The above description relates to structures of the system for recycling fibers from textiles waste. A method for recycling fibers from textiles waste by using the above system for recycling fibers from textiles waste will be described below.

Figure 6:
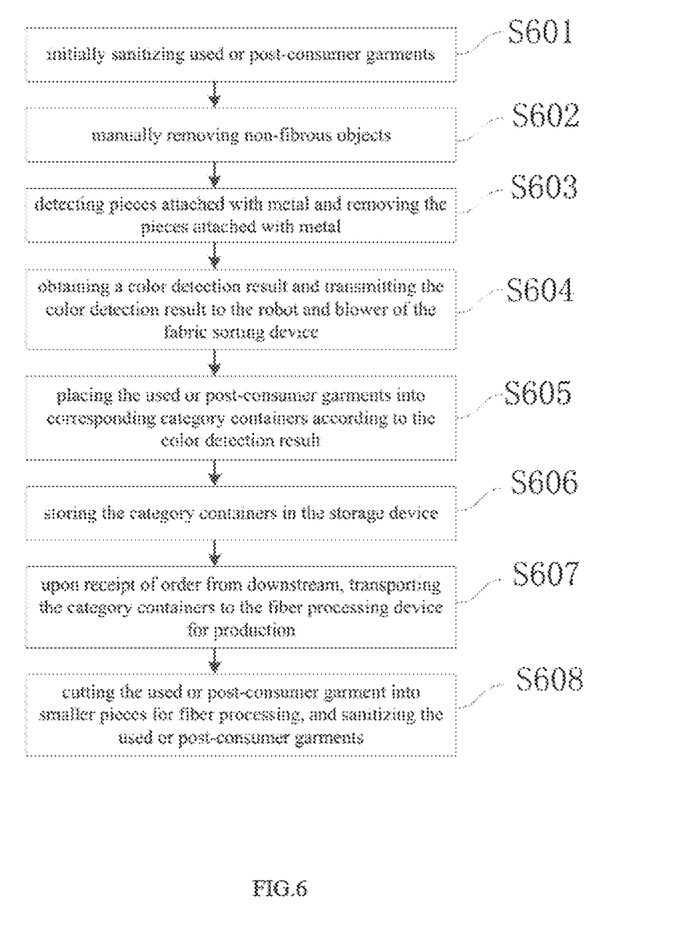
FIG. 6 is a flow chart showing a method for recycling fibers from textiles waste according to an exemplary embodiment.

FIG. 6 is a flow chart showing a method for recycling fibers from textiles waste according to an exemplary embodiment. As shown in FIG. 6, the method includes the following steps S601-S608.

The step S601 is to initially sanitize used or post-consumer garments.

The step S602 is to manually remove non-fibrous objects.

The step S603 is to detect pieces attached with metal and remove the pieces attached with metal.

The step S604 is to obtain a color detection result and transmit the color detection result to the robot of the fabric sorting device;

The step S605 is to place used or post-consumer garments into corresponding category containers according to the color detection result.

The step S606 is to store the category containers in the storage device.

The step S607 is to, upon receipt of order from downstream, transport the category containers to the fiber processing device for production.

The step S608 is to take the used or post-consumer garments such as color sorted fabrics out of the category containers and cut them into smaller pieces for fiber processing, and sanitize the used or post-consumer garments.

The system and method for recycling fibers from textiles waste according to exemplary embodiments of the present disclosure have following advantages.

Since the system includes a first sanitization device such as a sanitization gas fumigation device (sanitization gas such as hydrogen peroxide, ozone, ethylene oxide, etc.) and a second sanitization device such as an ultraviolet sanitization device, 90% or more micro-organisms on textiles waste such as used or post-consumer garments can be killed. Further, since the second sanitization device is mounted in the fiber processing device 700, apart from fabric surface, interlayer between fabric surfaces including the opened fiber structures are also sanitized by the second sanitization device.

The presence of the storage device helps to accumulate the filed category containers so that the filed category containers can be continuously and automatically fed to the fiber processing device 700 to achieve continuous and maximized throughput efficiency.

The dust closure 730 covers the whole fiber processing device 700 except for the feed port 710, thereby preventing dust or airborne bacteria from spreading to outside of the fiber processing device 700, and then avoiding secondary pollution.

The fabric sorting device 500 uses the robot and the blower to place sorted material into category containers 520, thereby eliminating or alleviating the dust problem.

The sliver made from fibers recycled according to the above method by using the above device has adequate physical properties (e.g. good fiber strength and hand feel) for further processing into yarn by spinning, then fabric by knitting or weaving, and then into garments.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A system for recycling fibers from textiles waste, comprising:
   a first sanitization device;
   a pre-processing device;
   a fabric sorting device;
   a storage device;
   a fiber processing device; and
   a second sanitization device mounted in the fiber processing device;
   wherein the first sanitization device, the pre-processing device, the fabric sorting device, the storage device and the fiber processing device are arranged along a transmission path of the textiles waste.

2. The system of claim 1, wherein the first sanitization device is a sanitization gas fumigation device; the sanitization gas comprises hydrogen peroxide, ozone, ethylene oxide.

3. The system of claim 2, wherein the first sanitization device includes at least one chamber, a container for carrying the textiles waste, a container cover in each chamber, a vacuum line, a sanitization gas line, a vacuum line valve with a first flexible hose extending through the container cover, a sanitization gas line valve with a second flexible hose extending through the container cover, a vacuum break valve with a third flexible hose extending through the container cover, a pressure gauge mounted in the container cover for detecting pressure in the container when the container is sealed by the container cover, and a driving mechanism configured to drive the container cover to seal the container or remove the container cover away from the container.

4. The system of claim 2, wherein the second sanitization device is an ultraviolet sanitization device.

5. The system of claim 2, further comprising a dust closure that covers the whole fiber processing device.

6. The system of claim 5, wherein the fiber processing device further includes a suction nozzle within the dust closure.

7. The system of claim 1, further comprising a detection device and a color detection device; wherein the first sanitization device, the pre-processing device, the detection device, the color detection device, the fabric sorting device, the storage device and the fiber processing device are sequentially connected along the transmission path of the textiles waste.

8. The system of claim 7, wherein the color detection device includes:
- a light booth;
- a conveyor extending through the light booth;
- a conveyor driving motor connecting with the conveyor;
- a light-booth inlet-output hood;
- a photo sensor in front of the light-booth inlet-output hood in the transmission path of the textiles waste;
- a light source disposed in the light booth;
- a first camera disposed in the light booth; and
- a second camera disposed in the light booth;
- wherein the light source, the first camera and the second camera cooperate to obtain a color detection result.

9. The system of claim 8, wherein a vertical position of the light source relative to the light booth is adjustable.

10. The system of claim 8, wherein a vertical position of each of the first camera and the second camera relative to the light booth is adjustable.

11. The system of claim 8, wherein the color detection device further includes a motor variable speed driver.

12. The system of claim 8, wherein the fabric sorting device includes a distributor, category containers and a robot and a blower; and the robot and the blower operate according to the color detection result.

13. The system of claim 1, wherein the storage device includes a storage region, rows of supporting structures in the storage region for carrying category containers, a rail between adjacent rows of supporting structures, and a cart slidably mounted on the rail.

14. A method for recycling fibers from textiles waste by using the system of claim 1, comprising:
- initially sanitizing the textiles waste with the first sanitization device;
- manually removing non-fibrous objects from the sanitized textiles waste;
- detecting pieces attached with metal and removing the pieces attached with metal;
- obtaining a color detection result and transmitting the color detection result to a robot and a blower of the fabric sorting device;
- placing, by the robot and the blower, the sanitized textiles waste into corresponding category containers according to the color detection result;
- storing the category containers in the storage device;
- upon receipt of order from the fiber processing device, transporting the category containers to the fiber processing device;
- cutting the sanitized textiles waste from the category containers into smaller pieces for fiber processing, and sanitizing the smaller pieces with the second sanitization device.

* * * * *